(12) United States Patent  
Kawamura

(10) Patent No.: US 7,894,322 B2
(45) Date of Patent: Feb. 22, 2011

(54) OPTICAL PICKUP AND INFORMATION EQUIPMENT

(75) Inventor: Makoto Kawamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 226 days.

(21) Appl. No.: 12/440,138

(22) PCT Filed: Sep. 29, 2006

(86) PCT No.: PCT/JP2006/319599

§ 371 (c)(1),
(2), (4) Date: Mar. 5, 2009

(87) PCT Pub. No.: WO2008/041307

PCT Pub. Date: Apr. 10, 2008

(65) Prior Publication Data

US 2009/0316560 A1    Dec. 24, 2009

(51) Int. Cl.
*G11B 7/00* (2006.01)
(52) U.S. Cl. .............................. 369/112.23; 369/112.24
(58) Field of Classification Search ........................ None
See application file for complete search history.

(56) References Cited

U.S. PATENT DOCUMENTS 7,369,481 B2 * 5/2008 Kimura et al. ......... 369/112.23
2009/0262635 A1 * 10/2009 Kimura et al. ......... 369/112.24

FOREIGN PATENT DOCUMENTS

| JP | 2003-99976 | 4/2003 |
| JP | 2003-132573 | 5/2003 |
| JP | 3538171 | 3/2004 |
| JP | 2004-327012 | 11/2004 |
| WO | WO 2005/124749 | 12/2005 |

OTHER PUBLICATIONS

International Search Report for PCT/JP2006/319599, mailed Oct. 31, 2006.

* cited by examiner

*Primary Examiner*—Paul Huber
(74) *Attorney, Agent, or Firm*—Nixon & Vanderhye P.C.

(57) ABSTRACT

An optical pickup (100) includes: an irradiating device (101) for irradiating a laser beam (LB); a first light focusing device (104) for focusing the laser beam on the recording medium (10); a collimator device (102) which is disposed on the optical path between the irradiating device and the first light focusing device and which can be displaced along the optical path of the laser beam; a splitting device (103) which reflects one portion of the laser beam and transmits therethrough another portion of the laser beam; a light receiving device (111) for receiving the reflected one portion of the laser beam; and a second light focusing device (112) for focusing, on the light receiving device, the reflected one portion of the laser beam, the light receiving device and the first light focusing device is disposed at a position at which rate of change in light density of the laser beam on the first light focusing device before and after displacement of the collimator device is substantially the same as that on the light receiving device before and after the displacement of the collimator device.

10 Claims, 14 Drawing Sheets

[FIG. 1]
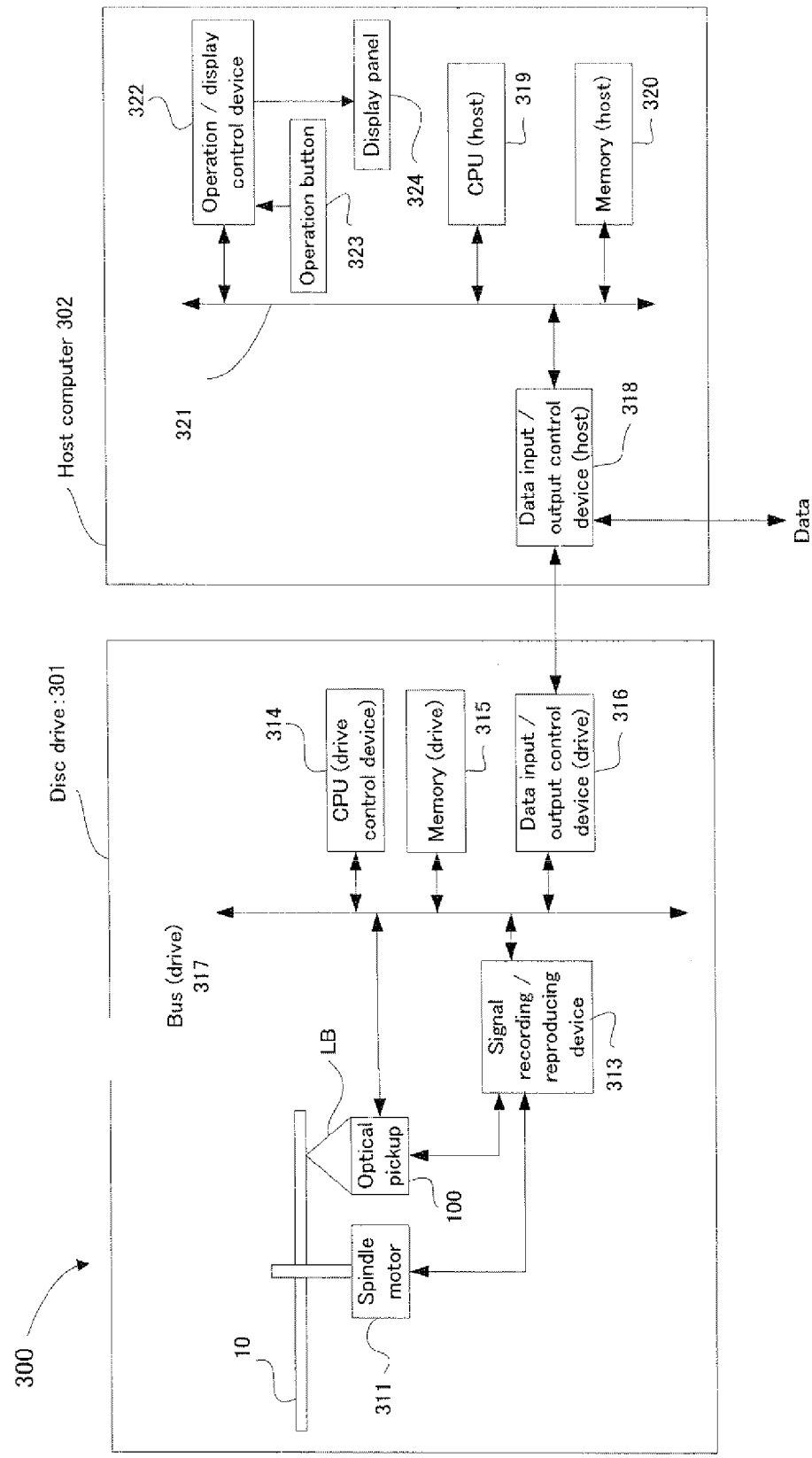

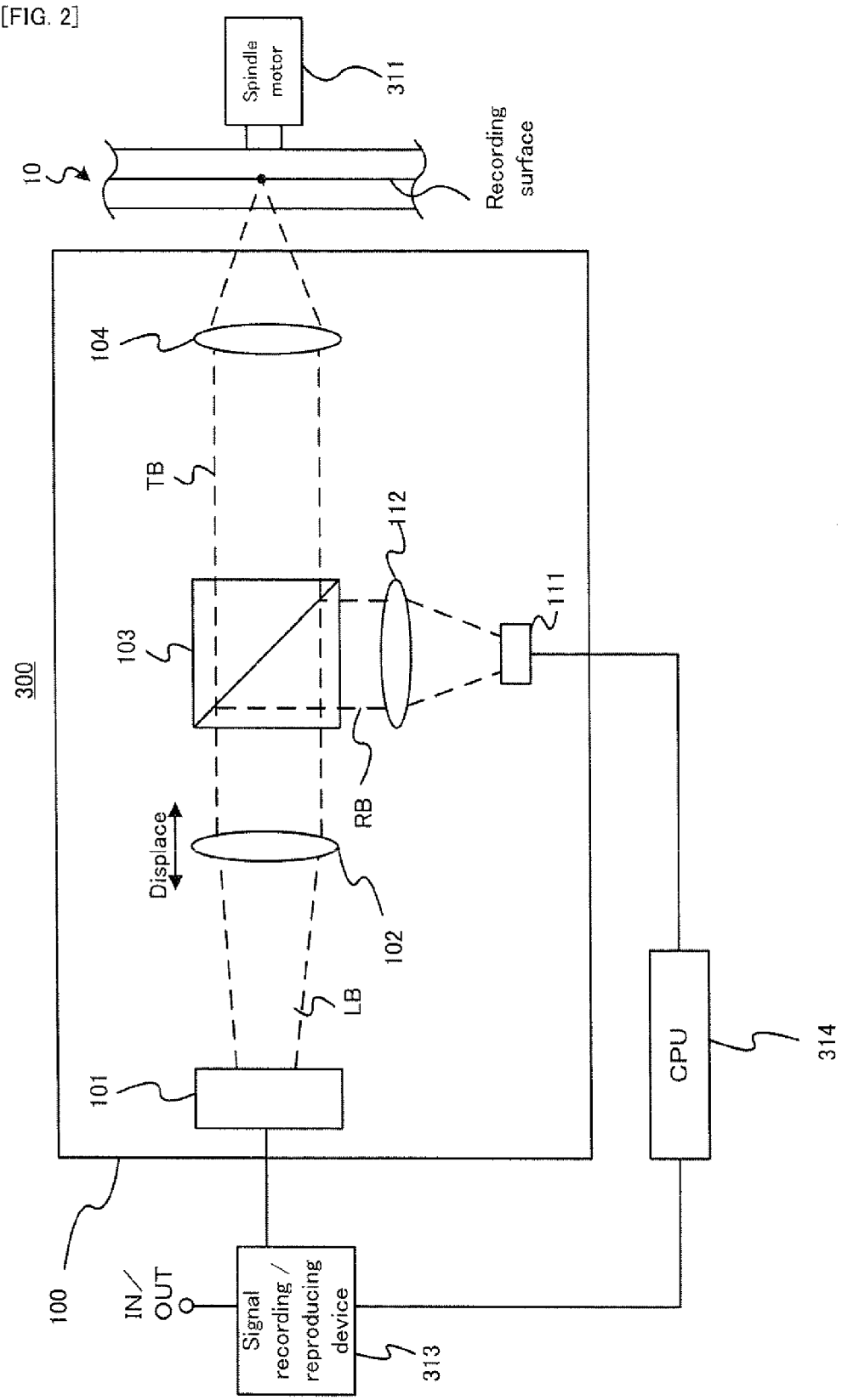
[FIG. 2]

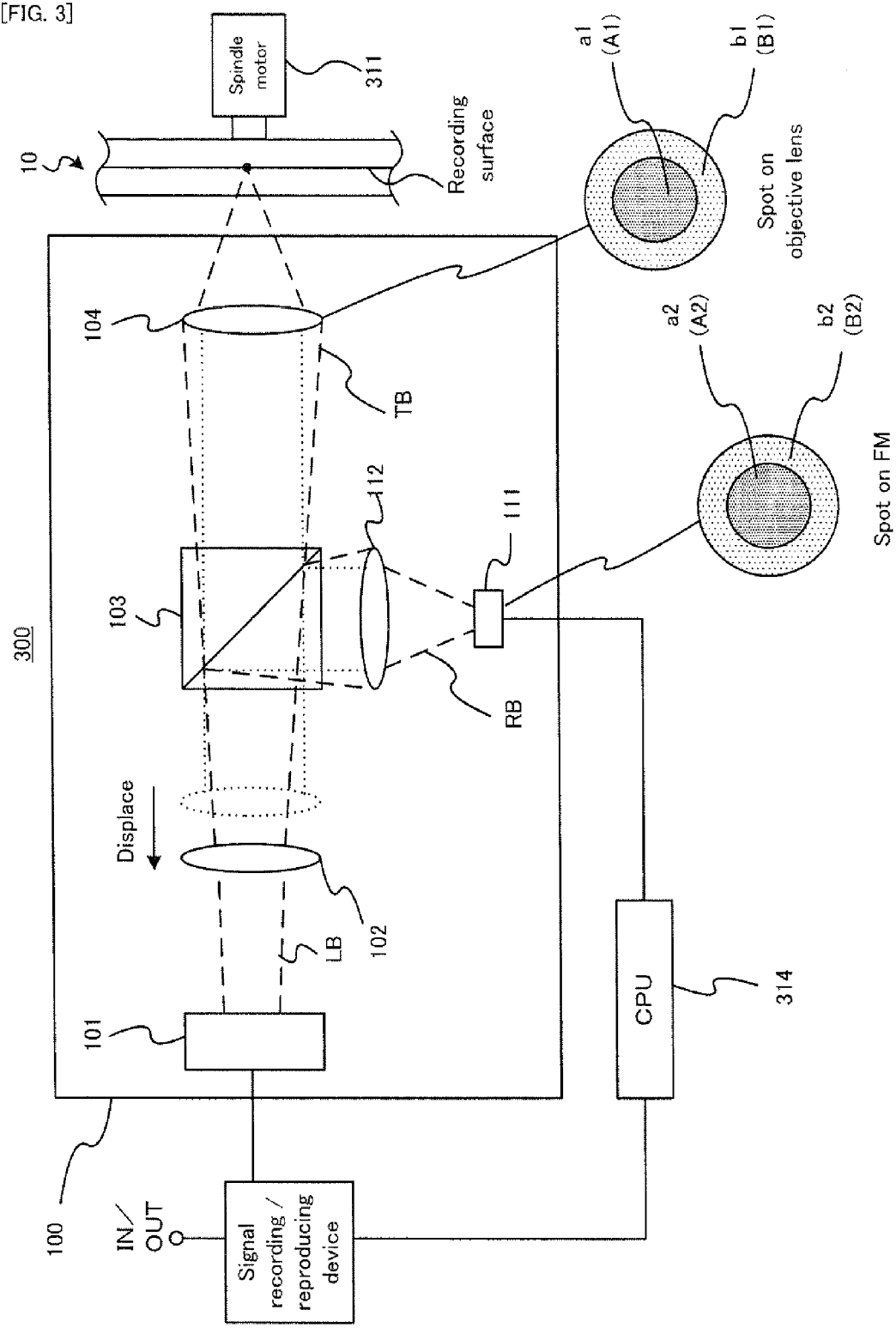
[FIG. 3]

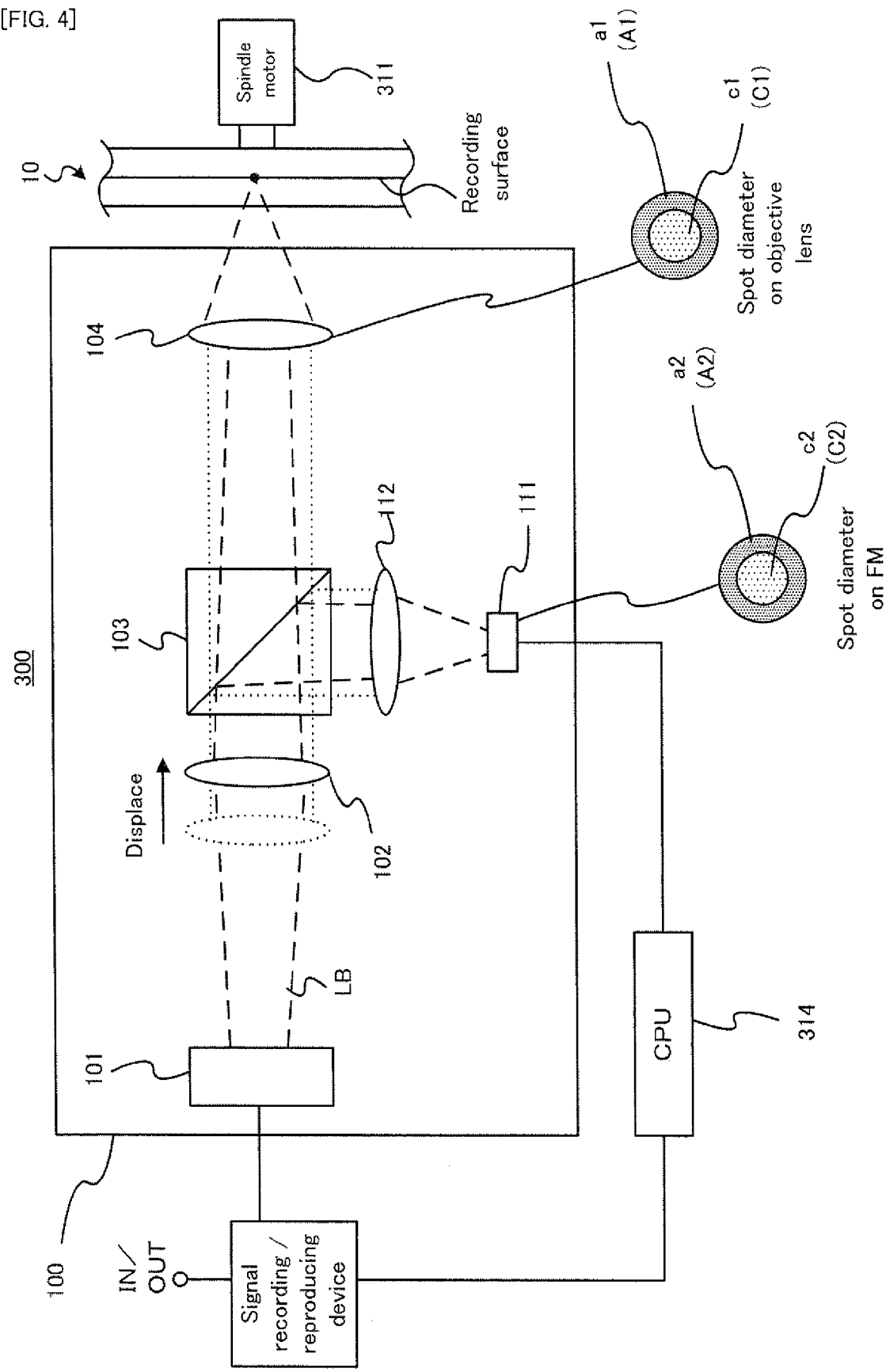

[FIG. 5]
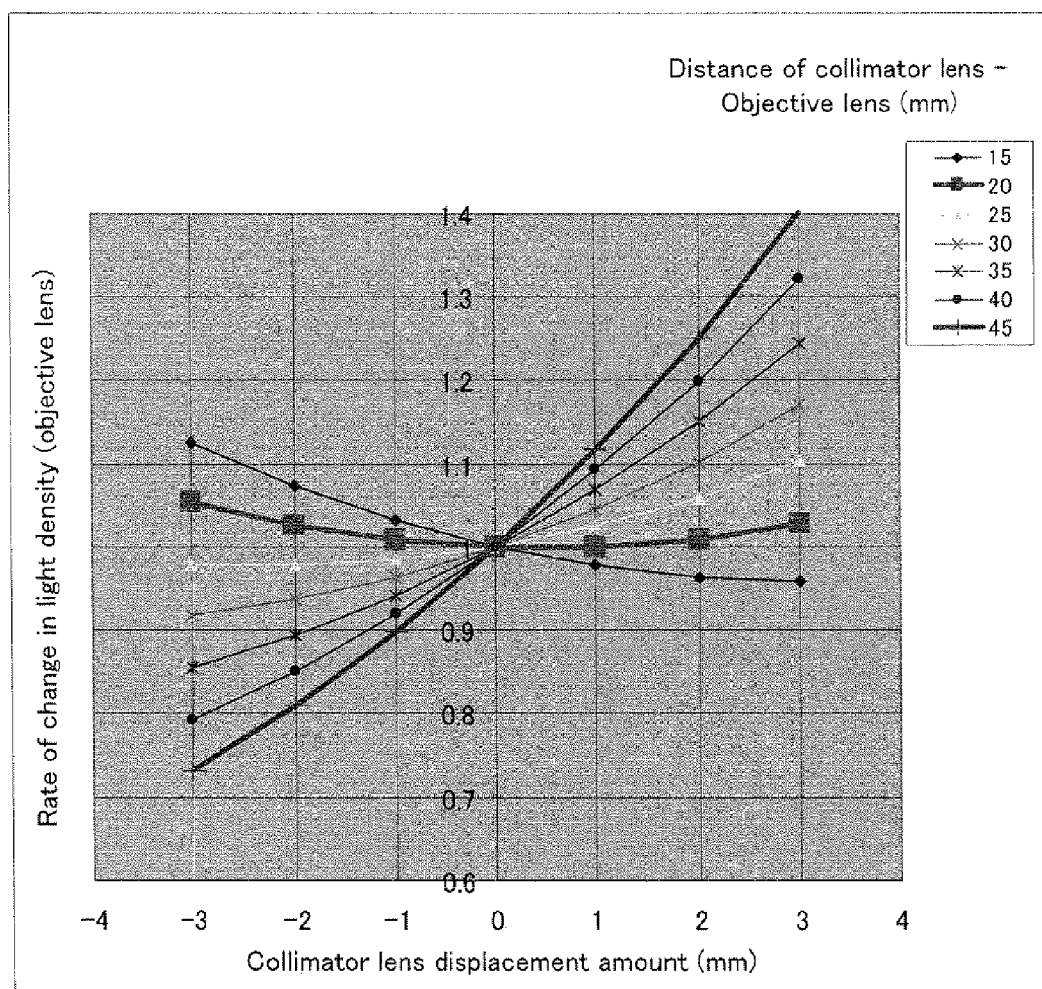

[FIG. 6]
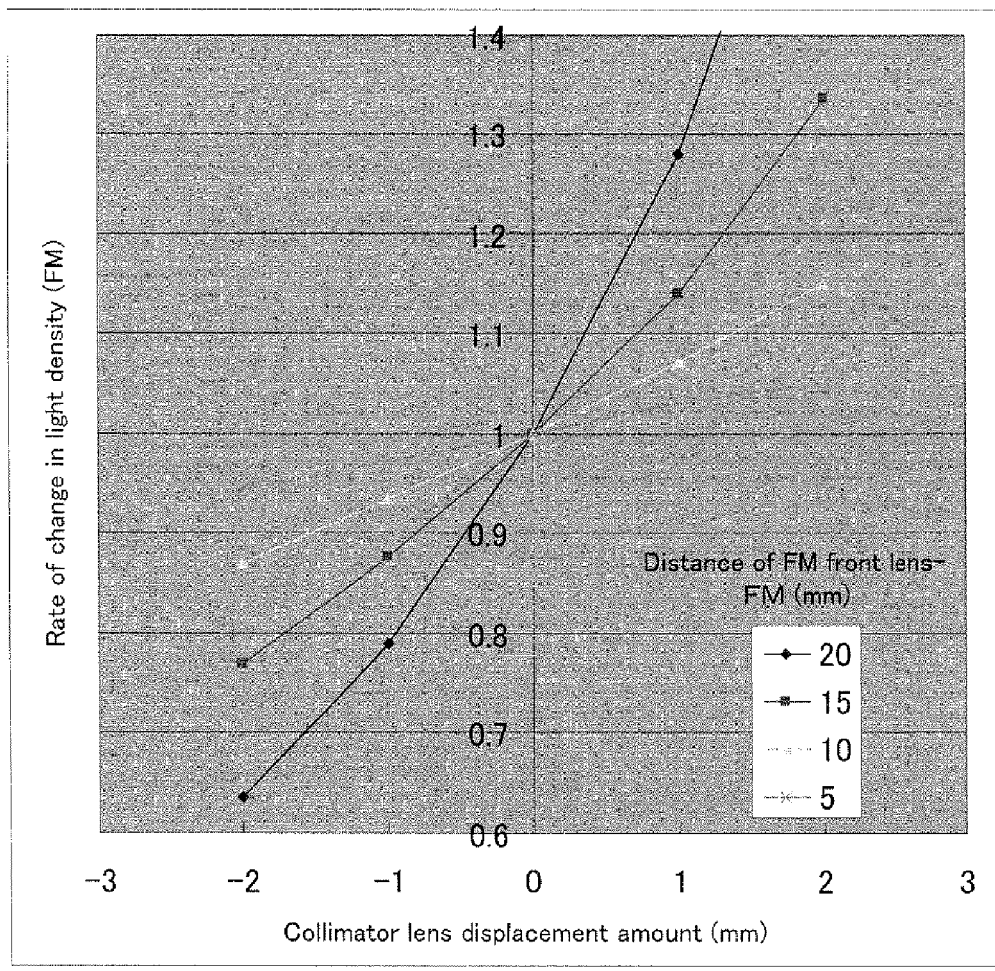
(a)
| Collimator lens displacement amount (mm) | Distance of FM front lens- FM (mm) | | | |
|---|---|---|---|---|
| | 20 | 15 | 10 | 5 |
| 2 | 1.71 | 1.34 | 1.15 | 1.05 |
| 1 | 1.28 | 1.14 | 1.07 | 1.03 |
| 0 | 1.00 | 1.00 | 1.00 | 1.00 |
| −1 | 0.79 | 0.88 | 0.94 | 0.97 |
| −2 | 0.64 | 0.77 | 0.87 | 0.94 |
(b)

[FIG. 7]
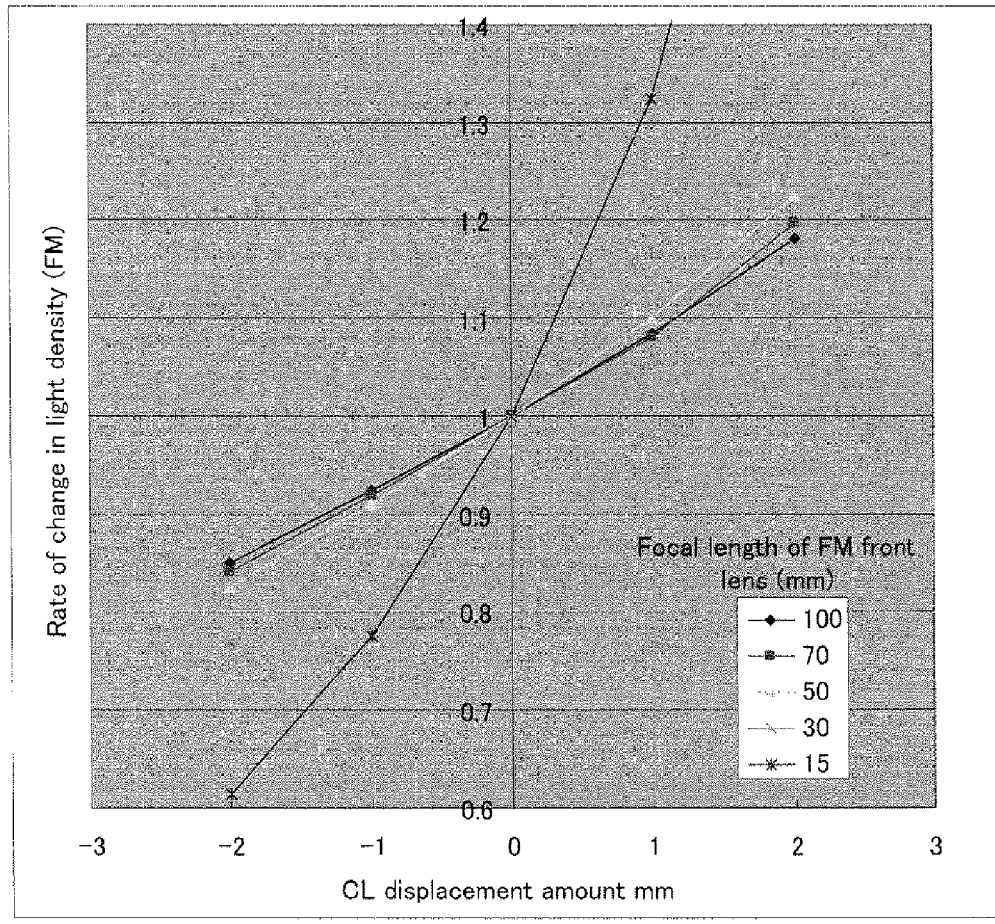
(a)
| Collimator lens displacement amount (mm) | Focal length of FM front lens (mm) | | | | |
|---|---|---|---|---|---|
| | 100 | 70 | 50 | 30 | 15 |
| 2 | 1.18 | 1.20 | 1.23 | 1.34 | 1.87 |
| 1 | 1.08 | 1.08 | 1.10 | 1.14 | 1.32 |
| 0 | 1.00 | 1.00 | 1.00 | 1.00 | 1.00 |
| −1 | 0.92 | 0.92 | 0.91 | 0.88 | 0.78 |
| −2 | 0.85 | 0.84 | 0.82 | 0.77 | 0.61 |
(b)

[FIG. 8]
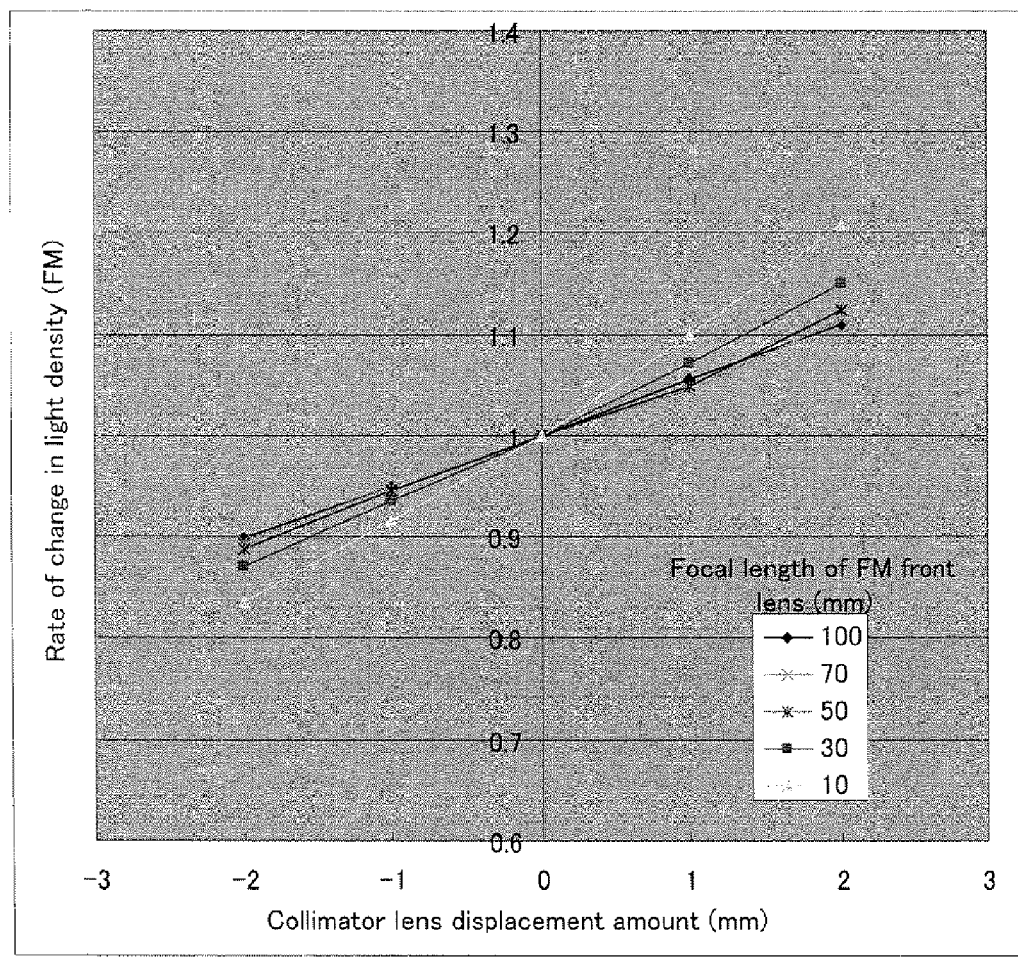
(a)
| Collimator lens displacement amount (mm) | Focal length of FM front lens (mm) | | | | |
|---|---|---|---|---|---|
| | 100 | 70 | 50 | 30 | 15 |
| 2 | 1.11 | 1.12 | 1.12 | 1.15 | 1.21 |
| 1 | 1.06 | 1.04 | 1.05 | 1.07 | 1.10 |
| 0 | 1.00 | 1.00 | 1.00 | 1.00 | 1.00 |
| −1 | 0.95 | 0.95 | 0.95 | 0.94 | 0.92 |
| −2 | 0.90 | 0.90 | 0.89 | 0.87 | 0.83 |
(b)

[FIG. 9]
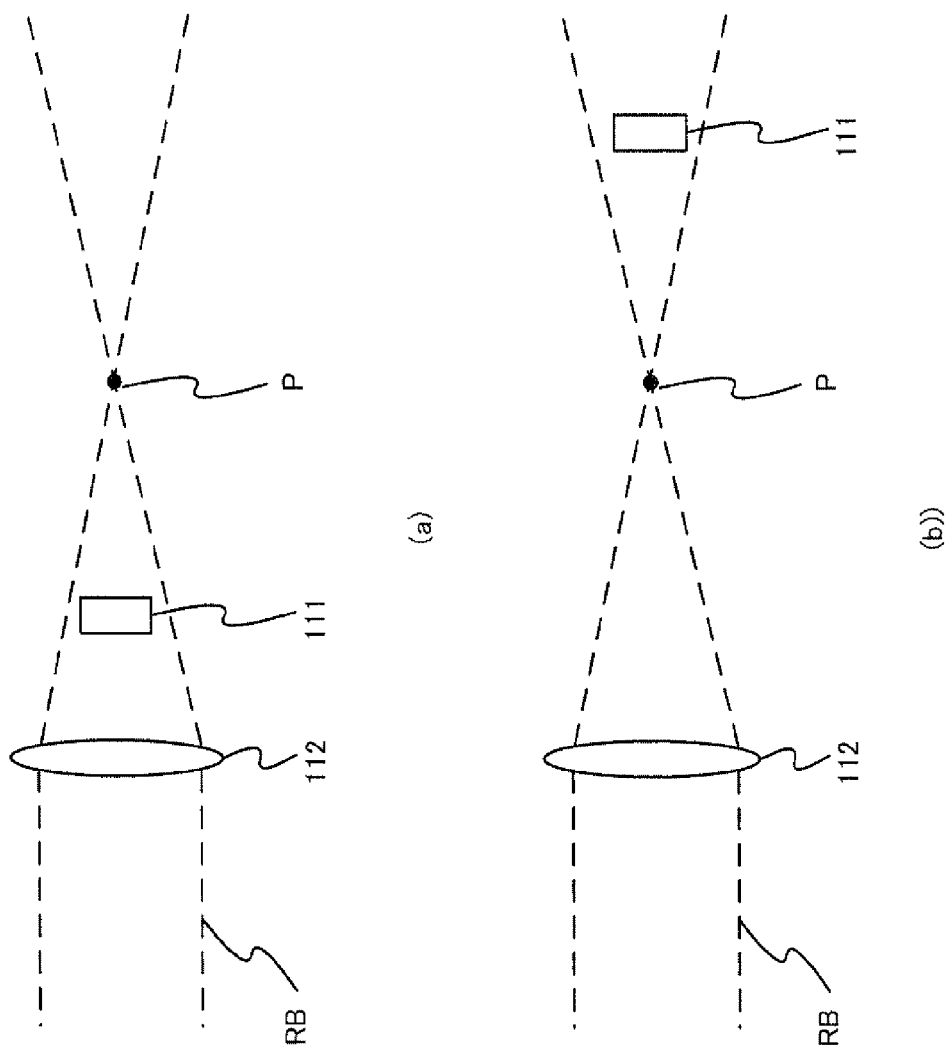

[FIG. 10]
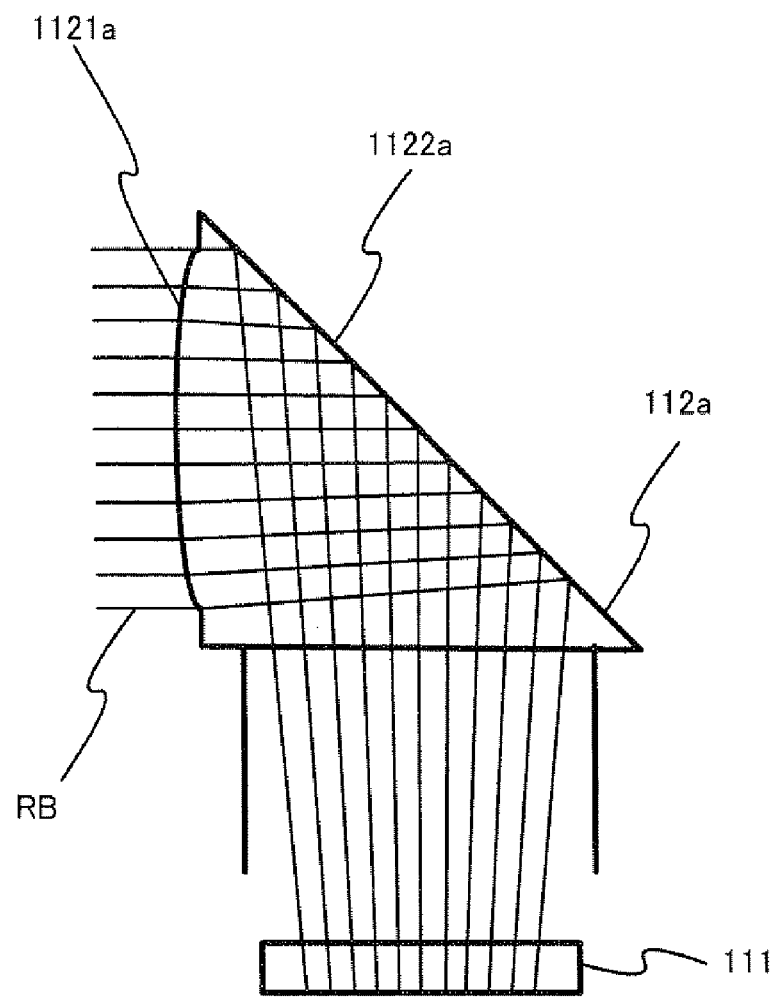

[FIG. 11]
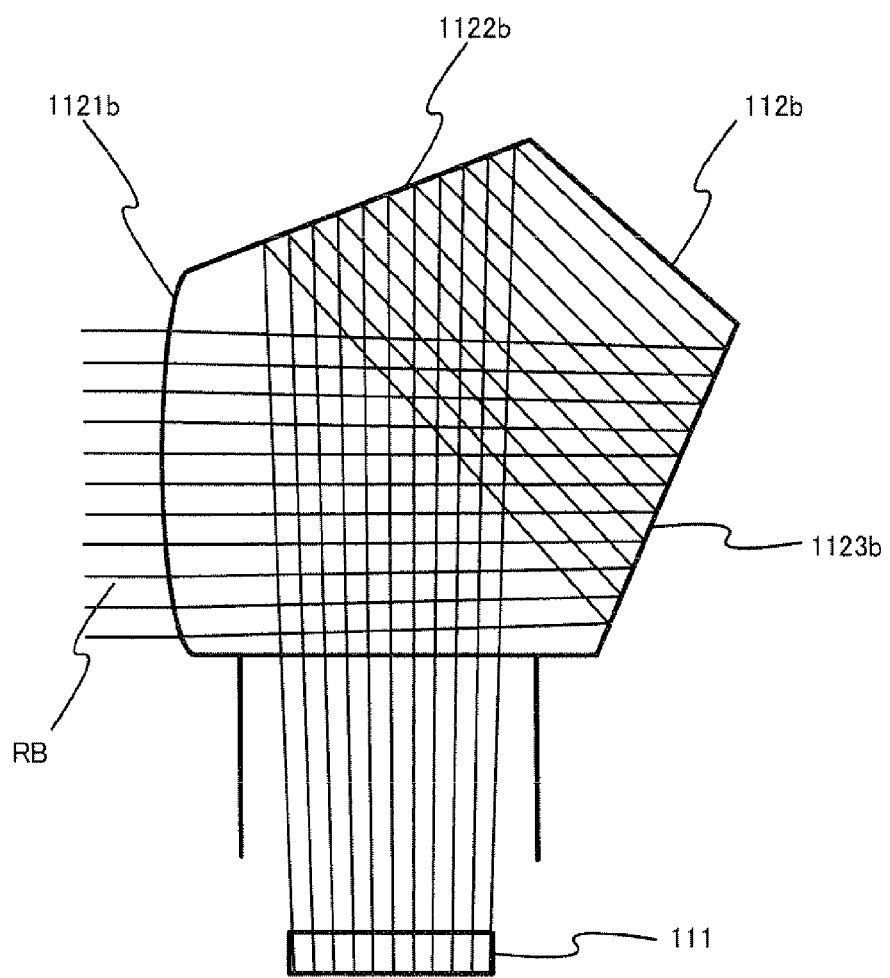

[FIG. 12]
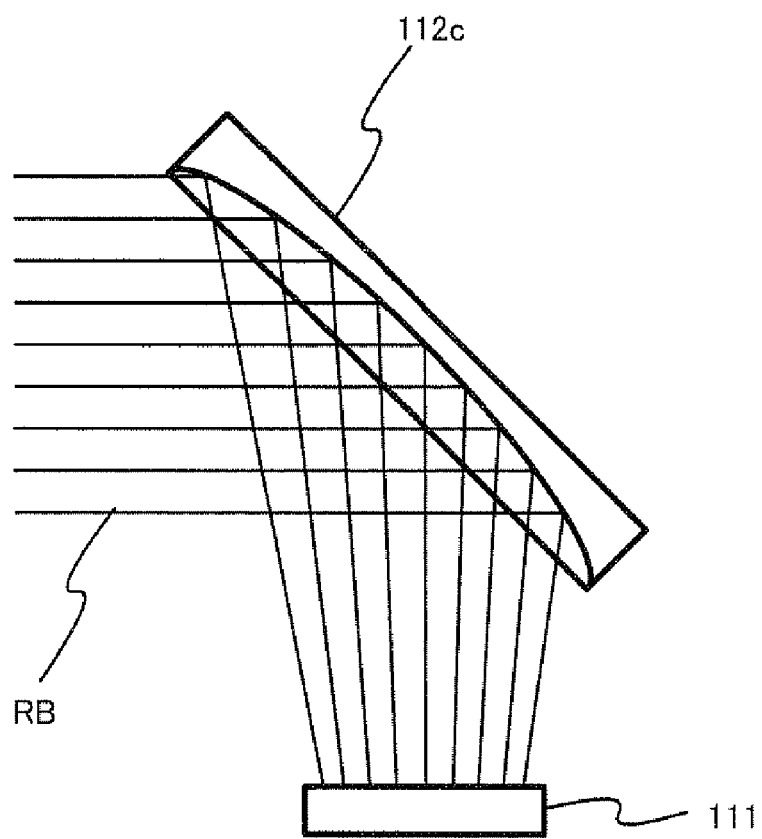

[FIG. 13]
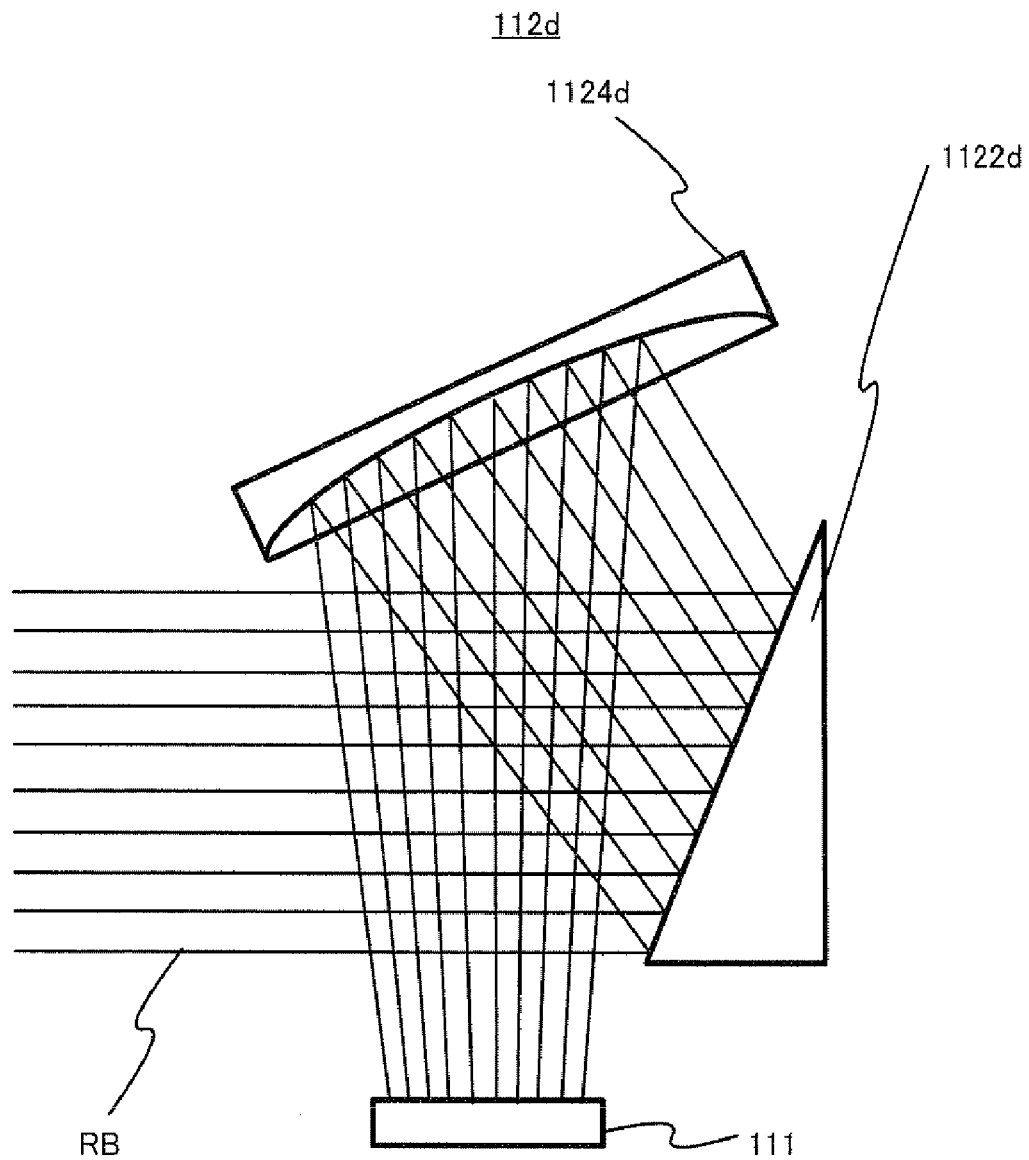

[FIG. 14]
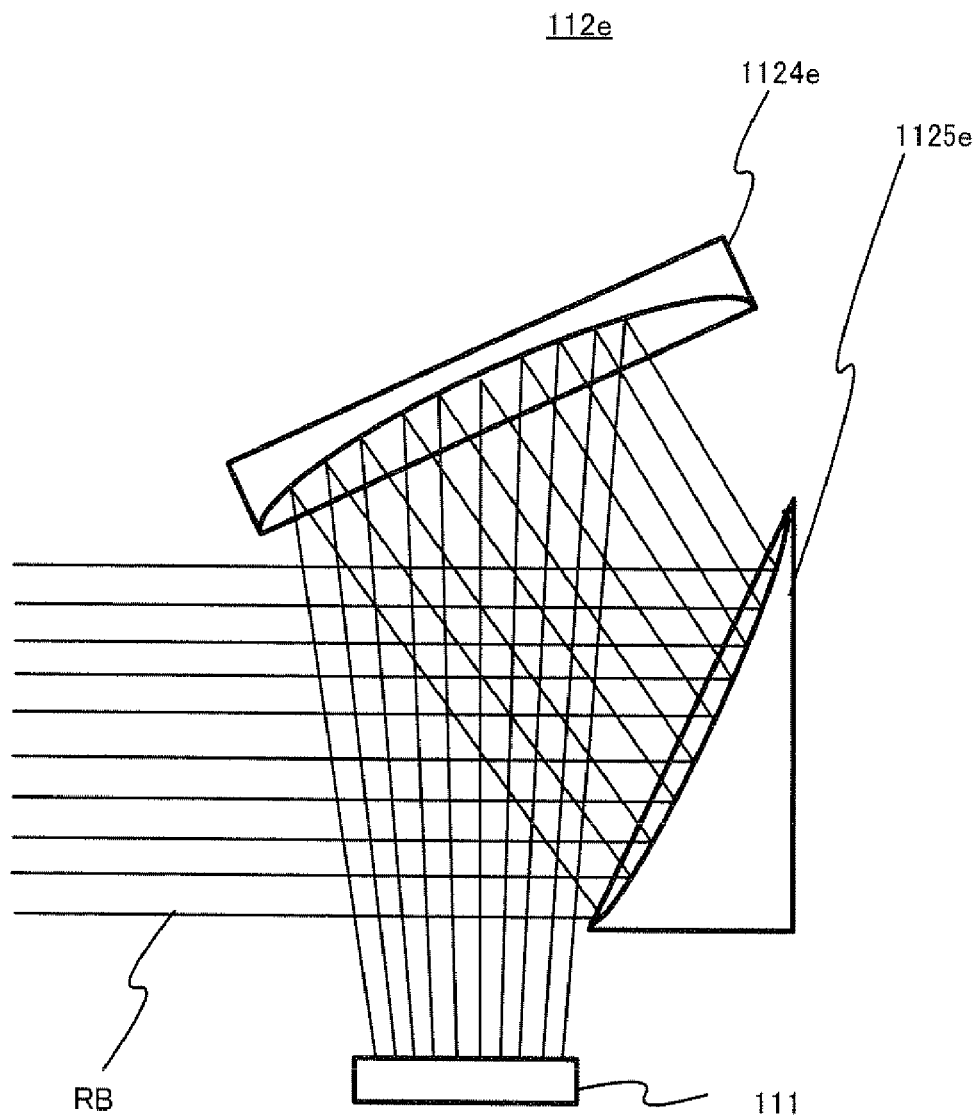

OPTICAL PICKUP AND INFORMATION EQUIPMENT

This application is a 371 of PCT/JP2006/319599, filed Sep. 29, 2006.

TECHNICAL FIELD

The present invention relates to an optical pickup for irradiating an optical disc with a laser beam, and information equipment provided with the optical pickup.

BACKGROUND ART

For example, like a CD and a DVD, an optical disc for optically recording or reproducing data using a laser beam or the like has been developed. In such an optical disc, there may be variation in substrate thickness. The variation in substrate thickness leads to the occurrence of spherical aberration. Therefore, in order to perform preferable recording and reproducing operations, it is necessary to reduce the influence of the spherical aberration caused by the variation in substrate thickness. One method developed for this purpose is a method of focusing the laser beam on a recording surface in accordance with the variation in substance thickness by changing the position of a collimator lens (or a condenser lens) in the optical path of the laser beam. Namely, a method of focusing the laser beam on the recording surface in accordance with the substrate thickness by converting the magnification of an optical system is developed.

On the other hand, the following technology is introduced into such an optical disc: a technology of controlling the light intensity of the laser beam emitted from a laser diode, by monitoring the light intensity of the laser beam emitted from the laser diode and by performing feed-forward control or feedback control on the basis of the monitored light intensity. Here, a patent document 1 discloses an optical disc apparatus for monitoring the light quantity of the laser beam after the position of the collimator lens is changed. Specifically, by performing opening limitation using an aperture on a lens which constitutes the optical system for monitoring the light intensity, the numerical aperture of the lens which constitutes the optical system for monitoring the light intensity is matched with the numerical aperture of an objective lens, and the optical arrangement of the lens, which constitutes the optical system for monitoring the light intensity, with respect to the collimator lens is matched with the optical arrangement of the objective lens with respect to the collimator lens. By this, it is possible to control the light intensity of the laser beam emitted from the laser diode, in view of variation in the light intensity of the laser beam at the objective lens, which focuses the laser beam on the optical disc.

Patent document 1: Japanese Patent NO. 3538171

DISCLOSURE OF INVENTION

Subject to be Solved by the Invention

However, in the optical disc apparatus disclosed in the patent document 1, the arrangement position or the like of the optical system for monitoring the light intensity is uniquely fixed. Namely, it has such a technical problem that the configuration disclosed in the patent document 1 cannot be realized in some cases due to the spatial limitation of the optical disc apparatus or the like.

In view of the aforementioned conventional problems, it is therefore an object of the present invention to provide an optical pickup and information equipment which can increase the degree of freedom in design while preferably controlling the light intensity of the laser beam.

Means for Solving the Subject

The above object of the present invention can be achieved by an optical pickup apparatus, according to claim 1, provided with an irradiating device for irradiating a laser beam to perform at least one of a recording operation and a reproducing operation on a recording medium; a first light focusing device which is disposed on an optical path of the laser beam between the irradiating device and the recording medium and which focuses the laser beam on the recording medium; a collimator device which is disposed on the optical path between the irradiating device and the first light focusing device and which can be displaced along the optical path of the laser beam; a splitting device which is disposed on the optical path between the collimator device and the first light focusing device, which reflects one portion of the laser beam, and which transmits therethrough another portion of the laser beam; a light receiving device for receiving the one portion of the laser beam reflected by the splitting device; and a second light focusing device for focusing, on the light receiving device, the one portion of the laser beam reflected by the splitting device, at least one of the light receiving device and the first light focusing device being disposed at a position at which rate of change in light density of the laser beam on the first light focusing device before and after displacement of the collimator device is substantially the same as rate of change in light density of the laser beam on the light receiving device before and after the displacement of the collimator device.

The above object of the present invention can be achieved by an information equipment, according to claim 10, provided with: an optical pickup apparatus provided with: an irradiating device for irradiating a laser beam to perform at least one of a recording operation and a reproducing operation on a recording medium; a first light focusing device which is disposed on an optical path of the laser beam between the irradiating device and the recording medium and which focuses the laser beam on the recording medium; a collimator device which is disposed on the optical path between the irradiating device and the first light focusing device and which can be to displaced along the optical path of the laser beam; a splitting device which is disposed on the optical path between the collimator device and the first light focusing device, which reflects one portion of the laser beam, and which transmits therethrough another portion of the laser beam; a light receiving device for receiving the one portion of the laser beam reflected by the splitting device; and a second light focusing device for focusing, on the light receiving device, the one portion of the laser beam reflected by the splitting device, at least one of the light receiving device and the first light focusing device being disposed at a position at which rate of change in light density of the laser beam on the first light focusing device before and after displacement of the collimator device is substantially the same as rate of change in light density of the laser beam on the light receiving device before and after the displacement of the collimator device; and a controlling device for controlling the optical pickup apparatus to perform at least one of the recording operation and the reproducing operation on the recording medium.

The operation and other advantages of the present invention will become more apparent from the embodiments explained below.

BRIEF DESCRIPTION OF DRAWINGS

FIG. 1 is a block diagram schematically showing the general structure of an information recording/reproducing apparatus provided with an optical pickup in an example.

FIG. 2 is a block diagram conceptually showing, in particular, the more detailed structure of a pickup, of the information recording/reproducing apparatus in the example.

FIG. 3 is an explanatory view conceptually showing each of aspects of a change in light density of a laser beam TB on an objective lens and a change in light density of the laser beam on a FM, in a case where a collimator lens is displaced optically away from an objective lens.

FIG. 4 is an explanatory view conceptually showing each of aspects of a change in light density of the laser beam TB on the objective lens and a change in light density of the laser beam on the FM, in a case where the collimator lens is displaced optically close to the objective lens.

FIG. 5 is a graph conceptually showing an aspect of the change in light density of the laser beam on the objective lens, caused by the displacement of the collimator lens.

FIG. 6 are a table and a graph conceptually showing an aspect of the change in light density of the laser beam on the FM, caused by the displacement of the collimator lens.

FIG. 7 are graphs conceptually showing an aspect of the change in light density of a laser beam RB on the FM, caused by the displacement of the collimator lens, in a case where the distance between a FM front lens and the FM is fixed to 15 mm.

FIG. 8 are graphs conceptually showing an aspect of the change in light density of the laser beam RB on the FM, caused by the displacement of the collimator lens, in a case where the distance between a FM front lens and the FM is fixed to 10 mm.

FIG. 9 are cross sectional views conceptually showing the arrangement position of the FM.

FIG. 10 is a cross sectional view conceptually showing a first specific structure of the FM front lens.

FIG. 11 is a cross sectional view conceptually showing a second specific structure of the FM front lens.

FIG. 12 is a cross sectional view conceptually showing a third specific structure of the FM front lens.

FIG. 13 is a cross sectional view conceptually showing a fourth specific structure of the FM front lens.

FIG. 14 is a cross sectional view conceptually showing a fifth specific structure of the FM front lens.

DESCRIPTION OF REFERENCE CODES 10 optical disc
100 optical pickup
101 hologram laser
102 collimator lens
103 beam splitter
104 objective lens
111 FM
112 FM front lens
300 information recording/reproducing apparatus
301 disc drive
302 host computer
313 signal recording/reproducing device
314 CPU

BEST MODE FOR CARRYING OUT THE INVENTION

Hereinafter, as the best mode for carrying out the invention, an explanation will be given on the embodiments of the optical pickup apparatus and the information equipment of the present invention.

Embodiment of Optical Pickup Apparatus

An embodiment of the optical pickup apparatus of the present invention is an optical pickup apparatus provided with: an irradiating device for irradiating a laser beam to perform at least one of a recording operation and a reproducing operation on a recording medium; a first light focusing device which is disposed on an optical path of the laser beam between the irradiating device and the recording medium and which focuses the laser beam on the recording medium; a collimator device which is disposed on the optical path between the irradiating device and the first light focusing device and which can be displaced along the optical path of the laser beam; a splitting device which is disposed on the optical path between the collimator device and the first light focusing device, which reflects one portion of the laser beam, and which transmits therethrough another portion of the laser beam; a light receiving device for receiving the one portion of the laser beam reflected by the splitting device; and a second light focusing device for focusing, on the light receiving device, the one portion of the laser beam reflected by the splitting device, at least one of the light receiving device and the first light focusing device being disposed at a position at which rate of change in light density of the laser beam on the first light focusing device before and after displacement of the collimator device is substantially the same as rate of change in light density of the laser beam on the light receiving device before and after the displacement of the collimator device.

According to the embodiment of the optical pickup apparatus of the present invention, the laser beam is irradiated by the irradiating device onto the recording medium. The laser beam irradiated by the irradiating device is focused on the recording medium by the first light focusing device. In particular, the focal point of the laser beam is placed on the recording medium (more specifically, a recording layer provided for the recording medium) by the first light focusing device. By this, a recording mark or the like is formed on the recording medium, and as a result, the data is recorded on the recording medium. In the same manner, the recording mark or the like formed on the recording medium is read, and as a result, the data recorded on the recording medium is reproduced.

At this time, the laser beam irradiated by the irradiating device becomes parallel light, or diverges or converges in accordance with the displacement of the collimator device in the direction along the optical path. In other words, in the laser beam irradiated by the irradiating device, the wave front is converted by the collimator device. The collimator device is displaced to correct spherical aberration which occurs in the optical system of the optical pickup apparatus. In the laser beam with the wave front converted by the collimator device, for example, one portion thereof is reflected by the splitting device in a direction of 90 degrees, and another portion thereof is transmitted through the splitting device toward the first light focusing device. The one portion of the laser beam reflected by the splitting device is focused on the light receiving device by the second light focusing device. The light receiving device measures the light intensity or the like of the received laser beam. The measurement result is used to control the light intensity (in other words, power) of the laser beam irradiated by the irradiating device.

Here, as described above, the displacement of the collimator device allows the laser beam to become parallel light, or diverge or converge. This changes the light density of the laser beam on the first light focusing device, and also changes the light density of the laser beam on the light receiving device. If the rate of change in light density of the laser beam on the first light focusing device is not substantially the same as the rate of change in light density of the laser beam on the light receiving device, the power of the laser beam irradiated by the irradiating device possibly varies from an appropriate value even if the power of the laser beam irradiated by the irradiating device is controlled using the light intensity or the like of the laser beam measured by the light receiving device. More specifically, if the rate of change in light density of the light beam on the light receiving device is a 10% decrease, the power of the laser beam is controlled such that the power of the laser beam irradiated by the irradiating device increases by 10%. On the other hand, if the rate of change in light density of the light beam on the first light focusing device is a 15% decrease, the power of the laser beam actually irradiated on the recording medium is reduced from a defined value by several percentages.

According to the embodiment, however, at least one of the light receiving device and the first light focusing device (and moreover the second light focusing device, the collimator device, or the like) is disposed at the position which allows the state that the rate of change in light density of the laser beam on the first light focusing device before and after the displacement of the collimator device is substantially the same as the rate of change in light density of the laser beam on the light receiving device before and after the displacement of the collimator device. More specifically, if the rate of change in light density of the light beam on the light receiving device is a 10% decrease, the rate of change in light density of the light beam on the first light focusing device is also a 10% decrease. Therefore, by controlling the power of the laser beam so that the power of the laser beam irradiated by the irradiating device increases by 10% on the basis of the measurement result by the light receiving device, it is possible to match the power of the laser beam actually irradiated on the recording medium with a defined value. In other words, even if the collimator device is displaced, it is possible to preferably control the power of the laser beam irradiated by the irradiating device.

In addition, if at least one of the light receiving device and the first light focusing device is disposed at the position which allows the state that the rate of change in light density of the laser beam on the first light focusing device is substantially the same as the rate of change in light density of the laser beam on the light receiving device, it is possible to arbitrarily select the arrangement positions of the light receiving device and the first light focusing device; namely, it is possible to increase the degree of freedom in design for the optical system. This is an extremely useful effect in practice, for the optical pickup apparatus which is largely limited in space.

Moreover, since it is only necessary to realize the state that the rate of change in light density of the laser beam on the first light focusing device is substantially the same as the rate of change in light density of the laser beam on the light receiving device, the focal point of the laser beam is not necessarily placed on the light receiving device. In other words, the laser beam is not necessarily focused on the light receiving device. Even by this, it is possible to increase the degree of freedom in design for the optical system.

Moreover, since it is only necessary to realize the state that the rate of change in light density of the laser beam on the first light focusing device is substantially the same as the rate of change in light density of the laser beam on the light receiving device, the opening of the second light focusing device is not necessarily the same as that of the first light focusing device. Even by this, it is possible to increase the degree of freedom in design for the optical system.

In one aspect of the embodiment of the optical pickup apparatus of the present invention, each of a focal length of the second light focusing device and a distance between the second light focusing device and the light receiving device is set such that the rate of change in light density of the laser beam on the first light focusing device before and after the displacement of the collimator device is substantially the same as the rate of change in light density of the laser beam on the first light focusing device before and after the displacement of said collimator device, the rate of change in light density of the laser beam on the first light focusing device being determined in accordance with the focal length of the second light focusing device and the distance between the second light focusing device and the light receiving device.

According to this aspect, it is possible to preferably determine the focal length of the second light focusing device and the distance or path length between the second light focusing device and the light receiving device. As a result, each of the light receiving device and the second light focusing device can be disposed at the position which allows the state that the rate of change in light density of the laser beam on the first light focusing device before and after the displacement of the collimator device is substantially the same as the rate of change in light density of the laser beam on the light receiving device before and after the displacement of the collimator device.

In another aspect of the embodiment of the optical pickup apparatus of the present invention, at least one of the light receiving device and the first light focusing device is disposed at a position at which aspects of the change in light density of the laser beam on the light receiving device and the first light focusing device before and after the displacement of said collimator device are in a linear relation.

According to this aspect, it is possible to control the power of the laser beam, relatively easily, on the basis of the measurement result by the light receiving device while preferably setting the arrangement position of each of the light receiving device and the second light focusing device.

In another aspect of the embodiment of the optical pickup apparatus of the present invention, a spot diameter of the laser beam irradiated on the light receiving device is greater than the light receiving device.

According to this aspect, it is possible to prevent such a disadvantage that the one portion of the laser beam reflected by the splitting device is not focused on the light receiving device, due to the positional deviation or the like of the light receiving device (and moreover, the second light focusing device) with respect to the optical path of the one portion of the laser beam reflected by the splitting device and the positional deviation or the like of another component which constitutes the optical system.

In another aspect of the embodiment of the optical pickup apparatus of the present invention, if light density on the first light focusing device increases as the collimator device is displaced close to the light receiving device, the light receiving device is disposed on a closer side, viewed from the second light focusing device, than a focal point of one portion of the laser beam reflected by the splitting device, which is placed by the second light focusing device.

According to this aspect, as explained in detail in Examples later, it is possible to preferably focus the one portion of the laser beam reflected by the splitting device, on the light receiving device while receiving the aforementioned various effects.

In another aspect of the embodiment of the optical pickup apparatus of the present invention, if light density on the first light focusing device decreases as the collimator device is displaced close to the light receiving device, the light receiving device is disposed on a farther side, viewed from the first light focusing device, than a focal point of one portion of the laser beam reflected by the splitting device, which is placed by the second light focusing device.

According to this aspect, as explained in detail in Examples later, it is possible to preferably focus the one portion of the laser beam reflected by the splitting device, on the light receiving device while receiving the aforementioned various effects.

In another aspect of the embodiment of the optical pickup apparatus of the present invention, the second light focusing device includes at least one of a lens, a reflecting mirror, and a prism.

According to this aspect, it is possible to form the second light focusing device, relatively easily. In addition, by appropriately combining the lens, the reflecting mirror, and the prism, it is possible to limit or control an increase in the physical size of the optical system while extending the optical path of the one portion of the laser beam reflected by the splitting device.

In an aspect of the optical pickup apparatus in which the second light focusing device includes at least one of the lens, the reflecting mirror, and the prism, as described above, the prism may be a multiangular prism.

By virtue of such construction, it is possible to form the second light focusing device, relatively easily. In addition, by appropriately combining the lens, the reflecting mirror, and the multiangular prism, it is possible to limit or control an increase in the physical size of the optical system while extending the optical path of the one portion of the laser beam reflected by the splitting device.

In an aspect of the optical pickup apparatus in which the second light focusing device includes at least one of the lens, the reflecting mirror may include at least one of a concave mirror and a convex mirror.

Embodiment of Information Equipment

An embodiment of the information equipment of the present invention is an information equipment provided with: an optical pickup apparatus provided with: an irradiating device for irradiating a laser beam to perform at least one of a recording operation and a reproducing operation on a recording medium; a first light focusing device which is disposed on an optical path of the laser beam between the irradiating device and the recording medium and which focuses the laser beam on the recording medium; a collimator device which is disposed on the optical path between the irradiating device and the first light focusing device and which can be displaced along the optical path of the laser beam; a splitting device which is disposed on the optical path between the collimator device and the first light focusing device, which reflects one portion of the laser beam, and which transmits therethrough another portion of the laser beam; a light receiving device for receiving the one portion of the laser beam reflected by the splitting device; and a second light focusing device for focusing, on the light receiving device, the one portion of the laser beam reflected by the splitting device, at least one of the light receiving device and the first light focusing device being disposed at a position at which rate of change in light density of the laser beam on the first light focusing device before and after displacement of the collimator device is substantially the same as rate of change in light density of the laser beam on the light receiving device before and after the displacement of the collimator device (i.e. the aforementioned embodiment of the optical pickup apparatus of the present invention (including its various aspects)); and a controlling device for controlling the optical pickup apparatus to perform at least one of the recording operation and the reproducing operation on the recording medium.

According to the embodiment of the information equipment of the present invention, it is possible to receive the same various effects as those received by the embodiment of the optical pickup apparatus described above.

Incidentally, in response to the aforementioned various aspects in the embodiment of the optical pickup apparatus of the present invention, the embodiment of the information equipment of the present invention can also adopt various aspects.

The operation and other advantages of the present invention will become more apparent from the examples explained below.

As explained above, according to the embodiment of the optical pickup apparatus of the present invention, each of the light receiving device and the second light focusing device is disposed at the position at which the rate of change in light density of the laser beam on the first light focusing device before and after the displacement of the collimator device is substantially the same as the rate of change in light density of the laser beam on the light receiving device before and after the displacement of the collimator device. According to the embodiment of the information equipment of the present invention, it is provided with the embodiment of the optical pickup apparatus of the present invention. Therefore, it is possible to increase the degree of freedom in design while preferably controlling the light intensity of the laser beam.

EXAMPLES

Hereinafter, the examples of the present invention will be explained on the basis of the drawings.

Firstly, with reference to FIG. 1, an explanation will be given on the basic structure of an information recording/reproducing apparatus (i.e. an example of the information equipment of the present invention) provided with an example of the optical pickup apparatus of the present invention. FIG. 1 is a block diagram schematically showing the general structure of an information recording/reproducing apparatus 300 provided with an optical pickup 100 in this example. Incidentally, the information recording/reproducing apparatus 300 has a function of recording data onto an optical disc 10 and a function of reproducing the data recorded on the optical disc 10.

As shown in FIG. 1, the information recording/reproducing apparatus 300 is provided with a disc drive 301 on which the optical disc 10 is actually loaded and on which the data recording and the data reproduction are performed; and a host computer 302, such as a personal computer, for controlling the data recording and reproduction with respect to the disc drive 301.

The disc drive 301 is provided with the optical disc 10, a spindle motor 311, an optical pickup 100, a signal recording/reproducing device 313, a CPU (drive control device) 314, a memory 315, a data input/output control device 316, and a bus 317. Moreover, the host computer 302 is provided with a data input/output control device 318, a CPU 319, a memory 320, a bus 321, an operation/display control device 322, an operation button 323, and a display panel 324.

The optical pickup 100 constitutes one specific example of the "optical pickup apparatus" of the present invention. In order to record the data onto the optical disc 10, the optical pickup 100 includes, for example, a hologram laser described later, various lenses, and the like. More specifically, the optical pickup 100 irradiates the optical disc 10 with a laser beam LB, as reading light with a first power upon reproduction, and as writing light with a second power with it modulated upon recording. Incidentally, the detailed structure of the optical pickup 100 will be described later (refer to FIG. 2).

The spindle motor 311 is to rotate and stop the optical disc 10, and operates in accessing the optical disc 10. More specifically, the spindle motor 311 is constructed to rotate the optical disc 10 at a predetermined speed and stop it, under the spindle servo provided by a servo unit or the like not illustrated.

The signal recording/reproducing device 313 constitutes one specific example of the "controlling device" of the present invention. The signal recording/reproducing device 313 performs the data recording/reproducing on the optical disc 10 by controlling the spindle motor 311 and the optical pickup 100. More specifically, the signal recording/reproducing device 313 is provided with a laser diode driver (LD driver), a head amplifier, and the like. The laser diode driver current-drives the hologram laser built in the optical pickup 100 to emit the laser beam LB. The head amplifier amplifies the output signal of the optical pickup 100, i.e., the reflected light of the laser beam LB, and outputs the amplified signal.

The memory 315 is used in the general data processing on the disc drive 301, including a data buffer area, an area used as an intermediate buffer when data is converted into the data that can be used on the signal recording/reproducing device 313, and the like. Moreover, the memory 315 is provided with a ROM area in which a program for performing an operation as a recording device, i.e., firmware, is stored; a RAM area in which a parameter required for the operation of the firmware program, a buffer for temporarily storing the record/reproduction data, or the like is stored; and the like.

The CPU (drive control device) 314 is connected to the signal recording/reproducing device 313 and the memory 315 through the bus 317, and it controls the entire disc drive 301 by giving instructions to various devices. Normally, software or firmware for operating the CPU 314 is stored in the memory 315.

The data input/output control device 316 controls the data input/output from the exterior with respect to the disc drive 301 and stores the data into or extracts it from a data buffer on the memory 315. A drive control command, which is issued from the external host computer 302 connected to the information recording/reproducing apparatus 300 via an interface, such as a SCSI (Small Computer System Interface) and an ATAPI (AT Attachment Packet Interface), is transmitted to the CPU 314 through the data input/output control device 316. Moreover, the data is also exchanged with the host computer 302 through the data input/output control device 316.

The operation/display control device 322 performs the reception of the operation instruction and display with respect to the host computer 302. The operation/display control device 322 sends the instruction to perform the recording or reproduction, using the operation bottom 323, to the CPU 319. The CPU 319 sends a control command to the information recording/reproducing apparatus 300 through the input/output control device 318 on the basis of the instruction information from the operation/display control device 322, to thereby control the entire disc drive 301. In the same manner, the CPU 319 can send a command of requiring the disc drive 301 to send the operational state to the host, to the disc drive 301. By this, it is possible to recognize the operational state of the disc drive 301, such as during recording and during reproduction. Thus, the CPU 319 can output the operational state of the disc drive 301, to the display panel 324, such as a fluorescent tube and a LCD, through the operation/display control device 322.

The memory 320 is an internal memory apparatus used by the host computer 302, and it is provided with, for example, a ROM area in which a firmware program such as BIOS (Basic Input/Output System) is stored; a RAM area in which a parameter required for the operation of an operating system, an application program, or the like is stored; and the like. Moreover, the memory 320 may be connected to an external memory apparatus such as a hard disk not illustrated, through the data input/output control device 318.

One specific example in which the disc drive 301 and the host computer 302, as explained above, are used together is household equipment, such as recorder equipment for recording video. The recorder equipment is to record a video signal from a broadcast reception tuner and an external connection terminal, onto a disc. The operation as the recorder equipment is performed by executing a program stored in the memory 320, on the CPU 319. Moreover, in another specific example, the disc drive 301 is a disc drive (hereinafter referred to as a drive, as occasion demands), and the host computer 302 is a personal computer or a workstation. The host computer 302, such as a personal computer and the drive are connected to each other through the data input/output control devices 316 and 318, such as the SCSI and the ATAPI. An application, such as reading software, which is installed in the host computer 302, controls the disc drive 301.

Next, with reference to FIG. 2, an explanation will be given on the more detailed explanation of the optical pickup 100 provided for the information recording/reproducing apparatus 300 in the example. FIG. 2 is a block diagram conceptually showing, in particular, the more detailed structure of the pickup 100, of the information recording/reproducing apparatus 300 in the example.

As shown in FIG. 2, the optical pickup 100 is provided with a hologram laser 101, a collimator lens 102, a beam splitter 103, an objective lens 104, a FM (Front Monitor) 111, and a FM front lens 112.

The hologram laser 101 constitutes one specific example of the "irradiating device" of the present invention. The hologram laser 101 has a laser diode capable of emitting the laser beam LB, a substrate, a photo detector (PD), a hologram element, and the like. The laser diode and the photo detector are disposed on the same substrate, and the hologram element is disposed facing the output side of the laser beam LB of the substrate. The laser diode irradiates the laser beam LB according to the type of the optical disc 10. More specifically, the laser diode irradiates the laser beam LB with a wavelength of 780 nm (i.e. infrared laser beam) if the optical disc 10 loaded on the information recording/reproducing apparatus 300 is a CD. Moreover, the laser diode irradiates the laser beam LB with a wavelength of 660 nm (i.e. red laser beam) if the optical disc 10 loaded on the information recording/reproducing apparatus 300 is a DVD. Moreover, the laser diode irradiates the laser beam LB with a wavelength of 420 nm (i.e. blue-violet laser beam) if the optical disc 10 loaded on the information recording/reproducing apparatus 300 is a HD DVD or a Blu-ray Disc. A light receiving element receives the incident laser beam LB. The hologram element transmits therethrough the laser beam LB outputted from a laser tip, and it reflects the laser beam LB entering from a surface opposite to the incident surface of the laser beam LB (i.e. the reflected light of the laser beam LB from the optical disc 10) to focus it on the photo detector on the substrate. The photo detector receives the focused reflected light and outputs the received result to the signal recording/reproducing device 313 as a light receiving signal. As a result, the data is reproduced.

Incidentally, instead of the hologram laser 101 in which the laser diode, the photo detector, and the like are provided in a group, the present invention may adopt the construction that the laser diode and the photo detector are separately provided.

The collimator lens 102 constitutes one specific example of the "collimator device" of the present invention. The collimator lens 102 makes the incident laser beam LB enter the beam splitter 103, as substantially parallel light.

The beam splitter 103 constitutes one specific example of the "splitting device" of the present invention. The beam splitter 103 reflects one portion of the laser beam LB irradiated by the hologram laser 101 in a direction of 90 degrees with respect to its optical axis to lead it to the FM 111, and it also transmits therethrough another portion of the laser beam LB irradiated by the hologram laser 101 to lead it to the objective lens 104.

Hereinafter, as occasion demands, one portion of the laser beam reflected on the beam splitter 103 is referred as "a laser beam RB" and another portion of the laser beam reflected on the beam splitter 103 is referred as "a laser beam TB" to distinguish them.

The objective lens 104 constitutes one specific example of the "first light focusing device" of the present invention. The objective lens 104 focuses and irradiates the incident laser beam TB on the recording surface of the optical disc 10. In particular, the objective lens 104 places the focal point of the incident laser beam TB on the recording surface of the optical disc 10.

Incidentally, the objective lens 104 can be displaced by an actuator not illustrated or the like, in a tracking direction and a focus direction.

The FM 111 constitutes one specific example of the "light receiving device" of the present invention. The FM 111 is provided with a photo detector or the like, and it is adapted to measure the light intensity of the laser beam LB irradiated from the hologram laser 101. The measured light intensity is outputted to the CPU 314. The CPU 314 controls the signal recording/reproducing device 313 on the basis of the light intensity outputted from the FM 111 such that the laser beam LB is irradiated from the hologram laser 101 with the preferable light intensity. For example, if the light intensity outputted from the FM 111 is less than a defined value, the CPU 314 controls the signal recording/reproducing device 313 such that the laser beam LB is irradiated from the hologram laser 101 with the higher light intensity. On the other hand, if the light intensity outputted from the FM 111 is greater than a defined value, the CPU 314 controls the signal recording/ reproducing device 313 such that the laser beam LB is irradiated from the hologram laser 101 with the lower light intensity.

The FM front lens 112 constitutes one specific example of the "second light focusing device" of the present invention. The FM front lens 112 focuses the laser beam RB reflected by the beam splitter 103, on the light receiving surface of the FM 111. At this time, the FM front lens 112 may or may not place the focal point of the laser beam RB on the light receiving surface of the FM 111. In other words, the FM front lens 112 may or may not allow the laser beam RB to form an image on the light receiving surface of the FM 111.

Here, particularly in the example, the collimator lens 102 can be displaced along the optical axis of the laser beam LB (in other words, optical path); namely, it can be displaced along an arrow direction shown in FIG. 2. The displacement of the collimator lens 102 is performed mainly to correct spherical aberration. More specifically, if the substrate thickness of the optical disc 10 has a deviation compared to a defined value (1.2 mm in CD, 0.6 mm in DVD and HD DVD, and 0.1 mm in Blu-ray Disc), the collimator lens 102 is displaced to diverge or converge the laser beam LB. By this, the spherical aberration can be corrected.

On the other hand, if the collimator lens 102 is displaced, the laser beam LB can be divergent light or convergent light. Thus, the laser beam TB entering the objective lens 104 and the laser beam RB entering the FM front lens 112 can be also divergent light or convergent light. By this, the light density of the laser beam TB on the objective lens 104 (or the light density of the laser beam TB at the position of the objective lens 104) is changed, and the light density of the laser beam RB at the position of the FM 111 (or the light density of the laser beam RB at the position of the FM 111) is also changed.

Now, with reference to FIG. 3 and FIG. 4, an explanation will be given on a change in light density of the laser beam TB on the objective lens 104 and a change in light density of the laser beam RB on the FM 111, which are associated with the displacement of the collimator lens 102. FIG. 3 is an explanatory view conceptually showing each of aspects of the change in light density of the laser beam TB on the objective lens 104 and the change in light density of the laser beam RB on the FM 111, in a case where the collimator lens 102 is displaced optically away from the objective lens 104. FIG. 4 is an explanatory view conceptually showing each of aspects of the change in light density of the laser beam TB on the objective lens and the change in light density of the laser beam RB on the FM 111, in a case where the collimator lens 102 is displaced optically close to the objective lens 104.

As shown in thin and fine dotted lines in FIG. 3 and FIG. 4, before the collimator lens 102 is displaced, the laser beam LB through the collimator lens 102 is parallel light. The spot of the laser beam TB on the objective lens 104 at this time is a spot a1 shown on the lower side of FIG. 3 and FIG. 4. Moreover, the light density of the laser beam TB on the objective lens 104 is A1. In the same manner the spot of the laser beam RB on the FM 111 is a spot a2 shown on the lower side of FIG. 3 and FIG. 4. Moreover, the light density of the laser beam RB on the FM 111 is A2.

On the one hand, as shown in thick and rough dashed lines in FIG. 3, if the collimator lens 102 is displaced optically away from the objective lens 104, the laser beam LB through the collimator lens 102 is divergent light. As a result, each of the spots of the laser beam TB on the objective lens 104 and the laser beam RB on the FM 111 becomes large. Specifically, the spot of the laser beam TB on the objective lens 104 is a spot b1 shown on the loser side of FIG. 3. Moreover, the light density of the laser beam TB on the objective lens 104 is B1. In the same manner, the spot of the laser beam RB on the FM 111 is a spot b2 shown on the lower side of FIG. 3. Moreover, the light density of the laser beam RB on the FM 111 is B2.

On the other hand, as shown in thick and rough dashed lines in FIG. 4, if the collimator lens 102 is displaced optically close to the objective lens 104, the laser beam LB through the collimator lens 102 is convergent light. As a result, each of the spots of the laser beam TB on the objective lens 104 and the laser beam RB on the FM 111 becomes small. Specifically, the spot of the laser beam TB on the objective lens 104 is a spot c1 shown on the loser side of FIG. 4. Moreover, the light density of the laser beam TB on the objective lens 104 is C1.

In the same manner, the spot of the laser beam RB on the FM 111 is a spot c2 shown on the lower side of FIG. 3. Moreover, the light density of the laser beam RB on the FM 111 is C2.

Incidentally, in the example shown in FIG. 3 and FIG. 4, the laser beam LB through the collimator lens 102 is divergent light if the collimator lens 102 is displaced optically away from the objective lens 104, and the laser beam LB through the collimator lens 102 is convergent light if the collimator lens 102 is displaced optically close to the objective lens 104. However, depending on the specification of the optical system of the optical pickup 100, it will be understood that the laser beam LB through the collimator lens 102 can be convergent light if the collimator lens 102 is displaced optically away from the objective lens 104 and that the laser beam LB through the collimator lens 102 can be divergent light if the collimator lens 102 is displaced optically close to the objective lens 104.

In particular in the example, each of the objective lens 104 and the FM 111 is disposed at a position which allows the state that an aspect of the change (e.g. rate of change) in light density of the laser beam TB on the objective lens 104 before and after the displacement of the collimator lens 102 is the same or substantially the same as an aspect of the change in light density of the laser beam RB on the FM 111 before and after the displacement of the collimator lens 102. Specifically, in FIG. 3, each of the objective lens 104 and the FM 111 is disposed at a position which can realize a relation of B1/A1=B2/A2.

Moreover, the hologram laser 101, the collimator lens 102, the beam splitter 103, the FM front lens 112, and the like, which are the other constituents of the optical pickup 100, are also preferably disposed in view of the aforementioned relation.

Now, with reference to FIG. 5 and FIG. 6, an explanation will be given on the optical pickup 100 to which more specific numeric numbers are applied. FIG. 5 is a graph conceptually showing an aspect of the change in light density of the laser beam TB on the objective lens 104, caused by the displacement of the collimator lens 102. FIG. 6 are a table and a graph conceptually showing an aspect of the change in light density of the laser beam RB on the FM 111, caused by the displacement of the collimator lens 102.

Incidentally, in the explanation using FIG. 5 and FIG. 6, the following preconditions are set as various parameters of the optical pickup 100. Specifically, the focal distance of the collimator lens 102 is set to 30 mm, the optical path length between the collimator lens 102 and the FM front lens 112 (incidentally, in the example, the "optical path length" shall indicate a distance along the optical axis of the laser beam LB) is set to 20 mm, the lens radium of the FM front lens 112 is set to 2 mm, the focal length of the FM front lens 112 is set to 30 mm, and the diameter of the light receiving surface of the FM 111 is set to 0.7 mm. Moreover, the displacement of the collimator lens 102 optically close to the objective lens 104 (i.e. in the displacement in the aspect shown in FIG. 4) is the displacement in a plus direction. Therefore, the displacement of the collimator lens 102 optically away from the objective lens 104 (i.e. in the displacement in the aspect shown in FIG. 3) is the displacement in a minus direction.

The light density of the laser beam TB on the objective lens 104 changes with respect to the displacement of the collimator lens 102, as the graph shown in FIG. 5. Incidentally, FIG. 5 shows a plurality of graphs obtained when the optical path length between the collimator lens 102 and the objective lens 104 is set to several values. If the optical path length between the collimator lens 102 and the objective lens 104 is 45 mm, 40 mm, 35 mm, 30 mm, or 25 mm, the light density of the laser beam TB on the objective lens 104 monotonically increases, with respect to the displacement of the collimator lens 102 in the plus direction. On the other hand, if the optical path length between the collimator lens 102 and the objective lens 104 is 15 mm, the light density of the laser beam TB on the objective lens 104 monotonically decreases, with respect to the displacement of the collimator lens 102 in the plus direction. On the one hand, if the optical path length between the collimator lens 102 and the objective lens 104 is 20 mm, the light density of the laser beam TB on the objective lens 104 decreases and then increases, with respect to the displacement of the collimator lens 102 in the plus direction. Moreover, if the optical path length between the collimator lens 102 and the objective lens 104 is 20 mm, the rate of change in light density of the laser beam TB on the objective lens 104 is relatively small.

Then, the light density of the laser beam RB on the FM 111 changes with respect to the displacement of the collimator lens 102, as the graph shown in FIG. 6($a$) and the table shown in FIG. 6($b$). Incidentally, FIG. 6($a$) and FIG. 6($b$) show a plurality of graphs obtained when the optical path length between the FM 111 and the FM front lens 112 is set to several values. In any case that the optical path length between the FM 111 and the FM front lens 112 is 20 mm, 15 mm, 10 mm, or 5 mm, the light density of the laser beam RB on the FM 111 monotonously increases, with respect to the displacement of the collimator lens 102 in the plus direction.

In the example, each of the objective lens 104 and the FM 111 is disposed so as to realize the state that the graph shown in FIG. 5 and the graph shown in FIG. 6($a$) match or substantially match, on the basis of the change in light density shown in FIG. 5 and FIG. 6.

Here, for example, if the optical path length between the collimator lens 102 and the objective lens 104 is set to 25 mm and if the optical path length between the FM 111 and the FM front lens 112 is set to 5 mm, it is possible to realize the state that the graph shown in FIG. 5 and the graph shown in FIG. 6($a$) match or substantially match. As a result, it is possible to realize the state that an aspect of the change (e.g. rate of change) in light density of the laser beam TB on the objective lens 104 before and after the displacement of the collimator lens 102 is the same or substantially the same as an aspect of the change in light density of the laser beam RB on the FM 111 before and after the displacement of the collimator lens 102.

In the same manner, for example, if the optical path length between the collimator lens 102 and the objective lens 104 is set to 35 mm and if the optical path length between the FM 111 and the FM front lens 112 is set to 10 mm, it is possible to realize the state that the graph shown in FIG. 5 and the graph shown in FIG. 6($a$) match or substantially match. As a result, it is possible to realize the state that an aspect of the change (e.g. rate of change) in light density of the laser beam TB on the objective lens 104 before and after the displacement of the collimator lens 102 is the same or substantially the same as an aspect of the change in light density of the laser beam RB on the FM 111 before and after the displacement of the collimator lens 102.

Of course, the example shown in FIG. 5 and FIG. 6 is one specific example. It will be understood that the objective lens 104 and the FM 111 may be disposed at other positions which allow the state that an aspect of the change in light density of the laser beam TB on the objective lens 104 before and after the displacement of the collimator lens 102 is the same or substantially the same as an aspect of the change in light density of the laser beam RB on the FM 111 before and after the displacement of the collimator lens 102.

As described above, according to the information recording/reproducing apparatus 300 in the example, the objective lens 104 and the FM 111 are disposed at positions which allow the state that the rate of change in light density of the laser beam TB on the objective lens 104 before and after the displacement of the collimator lens 102 is substantially the same as the rate of change in light density of the laser beam RB on the FM 111 before and after the displacement of the collimator lens 102. Thus, if the rate of change in light density of the laser beam RB on the FM 111 is a 10% decrease, the rate of change in light density of the laser beam TB on the objective lens 104 is also a 10% decrease. Therefore, by controlling the power of the laser beam LB so that the power of the laser beam LB irradiated by the hologram laser 101 increases by 10% on the basis of the measurement result of the light density by the FM 111, it is possible to match the power of the laser beam LB actually irradiated on the optical disc 10 with a defined value. In other words, even if the collimator lens 102 is displaced, it is possible to preferably control the power of the laser beam LB irradiated by the hologram laser 101.

In addition, if each of the objective lens 104 and the FM 111 is disposed at the position which allows the state that the rate of change in light density of the laser beam TB on the objective lens 104 is substantially the same as the rate of change in light density of the laser beam RB on the FM 111, it is possible to arbitrarily select the arrangement positions of the objective lens 104 and the FM 111; namely, it is possible to increase the degree of freedom in design for the optical system. This is an extremely useful effect in practice, for the optical pickup 100 which is largely limited in space.

Moreover, since it is only necessary to realize the state that the rate of change in light density of the laser beam TB on the objective lens 104 is substantially the same as the rate of change in light density of the laser beam RB on the FM 111, the focal point of the laser beam RB is not necessarily placed on the FM 111. In other words, the laser beam RB does not necessarily form an image on the FM 111. Even by this, it is possible to increase the degree of freedom in design for the optical system.

Moreover, since it is only necessary to realize the state that the rate of change in light density of the laser beam TB on the objective lens 104 is substantially the same as the rate of change in light density of the laser beam RB on the FM 111, the opening of the objective lens 104 is not necessarily the same as that of the FM front lens 112. In the same manner, the arrangement of the objective lens 104 is not necessarily the same as that of the FM front lens 112. Even by this, it is possible to increase the degree of freedom in design for the optical system.

Incidentally, each of the objective lens 104 and the FM 111 is disposed at the position which allows the state that the rate of change in light density of the laser beam TB on the objective lens 104 is substantially the same as the rate of change in light density of the laser beam RB on the FM 111. However, due to the spatial limitation of the optical pickup 100, there may be the case that each of the objective lens 104 and the FM 111 cannot be disposed at the preferable position. For example, there may be the case that the position of the FM 111 is inevitably determined due to the spatial limitation. In this case, using the position of the FM 111 inevitably determined as the precondition, if the objective lens 104 is disposed at the position which allows the state that the rate of change in light density of the laser beam TB on the objective lens 104 is substantially the same as the rate of change in light density of the laser beam RB on the FM 111, it is possible to appropriately receive the aforementioned various benefits. Moreover, if the arrangement of the objective lens 104 alone cannot realize the state that the rate of change in light density of the laser beam TB on the objective lens 104 is substantially the same as the rate of change in light density of the laser beam RB on the FM 111, other various parameters (e.g. the focal length of the FM front lens 112 or the like) may be also changed as occasion demands.

Such construction will be explained in more detail, with reference to FIG. 7 and FIG. 8. FIG. 7 are graphs conceptually showing an aspect of the change in light density of the laser beam RB on the FM 111, caused by the displacement of the collimator lens 102, in a case where the distance between the FM front lens 112 and the FM 111 is fixed to 15 mm. FIG. 8 are graphs conceptually showing an aspect of the change in light density of the laser beam RB on the FM 111, caused by the displacement of the collimator lens 102, in a case where the distance between the FM front lens 112 and the FM 111 is fixed to 10 mm.

Incidentally, in the explanation using FIG. 7 and FIG. 8, the parameters in the explanation using FIG. 5 and FIG. 6 shall be used as the various parameters of the optical pickup 100. However, the focal length of the FM front lens 112 is changed, as occasion demands. Moreover, in the explanation using FIG. 7, the example is shown that the distance between the FM front lens 112 and the FM 111 is fixed to 15 mm. In the explanation using FIG. 8, the example is shown that the distance between the FM front lens 112 and the FM 111 is fixed to 10 mm.

If the distance between the FM front lens 112 and the FM 111 is fixed to 15 mm, the light density of the laser beam RB on the FM 111 changes with respect to the displacement of the collimator lens 102, as the graph shown in FIG. 7(a) and the table shown in FIG. 7(b). Incidentally FIG. 7(a) and FIG. 7(b) show a plurality of graphs obtained when the focal length of the FM front lens 112 is set to several values. In any case that the focal length of the FM front lens 112 is 100 mm, 70 mm, 50 mm, 30 mm, or 15 mm, the light density of the laser beam RB on the FM 111 monotonically increases, with respect to the displacement of the collimator lens 102 in the plus direction.

In this case, each of the objective lens 104 and the FM 111 is disposed so as to realize the state that the graph shown in FIG. 5 and the graph shown in FIG. 7(a) match or substantially match, on the basis of the change in light density shown in FIG. 5 and FIG. 7.

Here, for example, if the optical path length between the collimator lens 102 and the objective lens 104 is set to 40 mm and if the focal length of the FM front lens 112 is set to 70 mm or 100 mm, it is possible to realize the state that the graph shown in FIG. 5 and the graph shown in FIG. 7(a) match or substantially match. As a result, it is possible to realize the state that an aspect of the change (e.g. rate of change) in light density of the laser beam TB on the objective lens 104 before and after the displacement of the collimator lens 102 is the same or substantially the same as an aspect of the change in light density of the laser beam RB on the FM 111 before and after the displacement of the collimator lens 102.

If the distance between the FM front lens 112 and the FM 111 is fixed to 10 mm, the light density of the laser beam RB on the FM 111 changes with respect to the displacement of the collimator lens 102, as the graph shown in FIG. 8(a) and the table shown in FIG. 8(b). Incidentally, FIG. 8(a) and FIG. 8(b) show a plurality of graphs obtained when the focal length of the FM front lens 112 is set to several values. In any case that the focal length of the FM front lens 112 is 100 mm, 70 mm, 50 mm, 30 mm, or 15 mm, the light density of the laser beam RB on the FM 111 monotonically increases, with respect to the displacement of the collimator lens 102 in the plus direction.

In this case, each of the objective lens 104 and the FM 111 is disposed so as to realize the state that the graph shown in FIG. 5 and the graph shown in FIG. 8(a) match or substantially match, on the basis of the change in light density shown in FIG. 5 and FIG. 8.

Here, for example, if the optical path length between the collimator lens 102 and the objective lens 104 is set to 40 mm and if the focal length of the FM front lens is set to 10 mm, it is possible to realize the state that the graph shown in FIG. 5 and the graph shown in FIG. 8(a) match or substantially match. As a result, it is possible to realize the state that an aspect of the change (e.g. rate of change) in light density of the laser beam TB on the objective lens 104 before and after the displacement of the collimator lens 102 is the same or substantially the same as an aspect of the change in light density of the laser beam RB on the FM 111 before and after the displacement of the collimator lens 102.

Moreover, with respect to the displacement of the collimator lens 102 in the plus direction, the light density of the laser beam TB on the objective lens 104 sometimes increases or sometimes decreases. At this time, the arrangement position of the FM 111 may be changed depending on whether the light density of the laser beam TB on the objective lens 104 increases or decreases. Such construction will be explained with reference to FIG. 9. FIG. 9 are cross sectional views conceptually showing the arrangement position of the FM 111.

As shown in FIG. 9(a), if the light density of the laser beam TB on the objective lens 104 increases with respect to the displacement of the collimator lens 102, the FM 111 is preferably disposed on the front side of a focal point p of the FM front lens 112 (i.e. on the closer side to the FM front lens 112).

On the other hand, as shown in FIG. 9(b), if the light density of the laser beam TB on the objective lens 104 decreases with respect to the displacement of the collimator lens 102, the FM 111 is preferably disposed on the rear side of the focal point p of the FM front lens 112 (i.e. on the farther side to the FM front lens 112).

Moreover, the size of the spot of the laser beam RB at the position of the FM 111 is preferably set greater than that of the light receiving surface of the FM 111. By this, it is possible to prevent such a disadvantage that the laser beam RB is not focused on the RM 111, due to the positional deviation or the like of the FM 111 and the FM front lens 112 with respect to the optical path of the laser beam RB.

Moreover, the objective lens 104 and the FM 111 may be also disposed at positions which allow the state that the light density linearly changes (i.e. changes in a linear relation) with respect to the displacement of the collimator lens 102. Alternatively, the objective lens 104 and the FM 111 may be also disposed at positions which allow the state that there is no change or a relatively small change in light density. Specifically, for example, as shown in FIG. 5, if the objective lens 104 is disposed at a distance of 20 mm from the collimator lens 102, it is possible to realize the state that there is no change or a relatively small change in light density.

Next, an explanation will be given on the more specific structures of the FM front lens 112, with reference to FIG. 10 to FIG. 14. FIG. 10 is a cross sectional view conceptually showing a first specific structure of the FM front lens 112. FIG. 11 is a cross sectional view conceptually showing a second specific structure of the FM front lens 112. FIG. 12 is a cross sectional view conceptually showing a third specific structure of the FM front lens 112. FIG. 13 is a cross sectional view conceptually showing a fourth specific structure of the FM front lens 112. FIG. 14 is a cross sectional view conceptually showing a fifth specific structure of the FM front lens 112.

As shown in FIG. 10, a prism 112a, in which a convex lens 1121a and a reflecting mirror 1122a are combined, may be used as the FM front lens 112. By using the prism 112a as the FM front lens 112, it is possible to ensure a certain degree of long distance between the collimator lens 102 and the FM 111. This is an extremely useful effect in practice since the relatively long optical path can be ensured in the optical pickup 100 which is largely limited in space by the physical shape.

As shown in FIG. 11, a pentaprism 112b, in which a convex lens 1121b and reflecting mirrors 1122b and 1123c are combined, may be used as the FM front lens 112. By using the pentaprism 112b as the FM front lens 112, it is possible to ensure a longer distance between the collimator lens 102 and the FM 111. This is an extremely useful effect in practice since the relatively long optical path can be ensured in the optical pickup 100 which is largely limited in space by the physical shape.

As shown in FIG. 12, a concave mirror 112c may be used as the FM front lens 112. By using the concave mirror 112c as the FM front lens 112, it is possible to ensure a longer distance between the collimator lens 102 and the FM 111, and it is also possible to relatively simplify the structure of the FM front lens 112.

Incidentally, the concave mirror 112c shown in FIG. 12 corresponds to the simplified prism 112a shown in FIG. 10.

As shown in FIG. 13, a structure 112d, in which a concave mirror 1124d and a reflecting mirror 1122d are combined, may be used as the FM front lens 112. By using the structure 112d as the FM front lens 112, it is possible to ensure a longer distance between the collimator lens 102 and the FM 111, and it is also possible to relatively simplify the structure of the FM front lens 112.

Incidentally, the structure 112d shown in FIG. 13 corresponds to the two-part structure of the pentaprism 112b shown in FIG. 11.

As shown in FIG. 14, a structure 112e, in which concave mirrors 1124e and 1125e are combined, may be used as the FM front lens 112. By using the structure 112e as the FM front lens 112, it is possible to ensure a longer distance between the collimator lens 102 and the FM 111, and it is also possible to relatively simplify the structure of the FM front lens 112.

Incidentally, the structure 112e shown in FIG. 14 corresponds to the two-part structure of the pentaprism 112b shown in FIG. 11.

The present invention is not limited to the aforementioned examples, but may be changed, if necessary, without departing from the gist or spirit of the invention, which can be read from all the claims and the specification thereof. The optical pickup apparatus and the information equipment with such a change are also included in the technical scope of the present invention.

The invention claimed is:

1. An optical pickup apparatus comprising:
an irradiating device for irradiating a laser beam to perform at least one of a recording operation and a reproducing operation on a recording medium;
a first light focusing device which is disposed on an optical path of the laser beam between said irradiating device and the recording medium and which focuses the laser beam on the recording medium;

a collimator device which is disposed on the optical path between said irradiating device and said first light focusing device and which can be displaced along the optical path of the laser beam;

a splitting device which is disposed on the optical path between said collimator device and said first light focusing device, which reflects one portion of the laser beam, and which transmits therethrough another portion of the laser beam;

a light receiving device for receiving the one portion of the laser beam reflected by said splitting device; and a second light focusing device for focusing, on said light receiving device, the one portion of the laser beam reflected by said splitting device, at least one of said light receiving device and said first light focusing device being disposed at a position at which rate of change in light density of the laser beam on said first light focusing device before and after displacement of said collimator device is substantially the same as rate of change in light density of the laser beam on said light receiving device before and after the displacement of said collimator device.

2. The optical pickup apparatus according to claim 1, wherein each of a focal length of said second light focusing device and a distance between said second light focusing device and said light receiving device is set such that the rate of change in light density of the laser beam on said first light focusing device before and after the displacement of said collimator device is substantially the same as the rate of change in light density of the laser beam on the first light focusing device before and after the displacement of said collimator device, the rate of change in light density of the laser beam on said first light focusing device being determined in accordance with the focal length of said second light focusing device and the distance between said second light focusing device and said light receiving device.

3. The optical pickup apparatus according to claim 1, wherein at least one of said light receiving device and said first light focusing device is disposed at a position at which aspects of the change in light density of the laser beam on said light receiving device and said first light focusing device before and after the displacement of said collimator device are in a linear relation.

4. The optical pickup apparatus according to claim 1, wherein a spot diameter of the laser beam irradiated on said light receiving device is greater than said light receiving device.

5. The optical pickup apparatus according to claim 1, wherein if light density on said first light focusing device increases as said collimator device is displaced close to said light receiving device, said tight receiving device is disposed on a closer side, viewed from said second light focusing device, than a focal point of one portion of the laser beam reflected by said splitting device, which is placed by said second light focusing device.

6. The optical pickup apparatus according to claim 1, wherein if light density on said first light focusing device decreases as said collimator device is displaced close to said light receiving device, said light receiving device is disposed on a farther side, viewed from said first light focusing device, than a focal point of one portion of the laser beam reflected by said splitting device, which is placed by said second light focusing device.

7. The optical pickup apparatus according to claim 1, wherein said second light focusing device includes at least one of a lens, a reflecting mirror, and a prism.

8. The optical pickup apparatus according to claim 7, wherein the prism is a multiangular prism.

9. The optical pickup apparatus according to claim 7, wherein the reflecting mirror includes at least one of a concave mirror and a convex mirror.

10. An information equipment comprising:

an optical pickup apparatus comprising: an irradiating device for irradiating a laser beam to perform at least one of a recording operation and a reproducing operation on a recording medium; a first light focusing device which is disposed on an optical path of the laser beam between said irradiating device and the recording medium and which focuses the laser beam on the recording medium; a collimator device which is disposed on the optical path between said irradiating device and said first light focusing device and which can be displaced along the optical path of the laser beam; a splitting device which is disposed on the optical path between said collimator device and said first light focusing device, which reflects one portion of the laser beam, and which transmits therethrough another portion of the laser beam; a light receiving device for receiving the one portion of the laser beam reflected by said splitting device; and a second light focusing device for focusing, on said light receiving device, the one portion of the laser beam reflected by said splitting device, at least one of said light receiving device and said first light focusing device being disposed at a position at which rate of change in light density of the laser beam on said first light focusing device before and after displacement of said collimator device is substantially the same as rate of change in light density of the laser beam on said light receiving device before and after the displacement of said collimator device; and a controlling device for controlling said optical pickup apparatus to perform at least one of the recording operation and the reproducing operation on the recording medium.

* * * * *